US008332447B2

(12) United States Patent
Iwasa

(10) Patent No.: US 8,332,447 B2
(45) Date of Patent: Dec. 11, 2012

(54) SYSTEMS AND METHODS FOR PERFORMING FIXED-POINT FRACTIONAL MULTIPLICATION OPERATIONS IN A SIMD PROCESSOR

(75) Inventor: Shigeaki Iwasa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 738 days.

(21) Appl. No.: 12/555,298

(22) Filed: Sep. 8, 2009

(65) Prior Publication Data

US 2011/0060781 A1    Mar. 10, 2011

(51) Int. Cl.
*G06F 12/14* (2006.01)
*G06F 12/00* (2006.01)
(52) U.S. Cl. .................. 708/209; 708/201; 708/205
(58) Field of Classification Search .................. None
See application file for complete search history.

(56) References Cited

U.S. PATENT DOCUMENTS 5,119,324 A * 6/1992 Ahsan ........................... 708/520

* cited by examiner

*Primary Examiner* — Scott Sun

(74) *Attorney, Agent, or Firm* — Law Office of Mark L. Berrier

(57) ABSTRACT

Systems and methods for performing multiplication of fixed-point fractional values with the same throughput as addition and subtraction operations, and without loss of accuracy in the result. In one embodiment, a method includes reading data from a pair of source registers that contains multiple single-width multiplicand values. Each multiplicand value in one of the source registers is paired with a corresponding multiplicand value in the other source register. For each pair of multiplicands, a double-width product is generated, then a single-width portion of the product is selected and stored in a target register. The selection of the single-width portion is performed by shifting the double-width products in funnel shifters. The immediate shifting of the double-width products to select the single-width portions allows the operation to achieve the same throughput as addition and subtraction operations.

20 Claims, 8 Drawing Sheets

SYSTEMS AND METHODS FOR PERFORMING FIXED-POINT FRACTIONAL MULTIPLICATION OPERATIONS IN A SIMD PROCESSOR

BACKGROUND

1. Field of the Invention

The invention relates generally to computer systems and more particularly to systems and methods for performing multiplication of fixed-point fractional values with the same throughput as addition and subtraction operations, and without loss of accuracy in the result.

2. Related Art

Modern computer systems provide ever-increasing capacity to process data. This capacity is expanded by making processors faster, smaller and more efficient. Often, computer systems will implement several processor cores to process data in parallel. Even the processors themselves may be designed to process instructions that have a single command and multiple data items. The systems must be designed, however, to process instructions as quickly as possible in order to take advantage of their speed and size.

For example, many modern processors are intended to be used for multimedia applications in which a large number of relatively complex instructions must be executed. One of the common functions performed by these processors is color conversion. A typical multimedia processor continuously performs color conversion on the image data that is displayed to the user, so inefficiency in this process can drastically reduce the performance of the processor.

An example of a color conversion computation is illustrated below. In this example, a color data consisting of RGB component values is converted into YUV component values. The conversion is performed using a matrix of conversion coefficients $C_{ij}$. The conversion function is defined by the equations:

$$Y=C_{11}*R+C_{12}*G+C_{13}*B$$

$$U=C_{21}*R+C_{22}*G+C_{23}*B$$

$$V=C_{31}*R+C_{32}*G+C_{33}*B$$

where each of the RGB component values is between 0 and 2, each of the conversion coefficients is between −2 and 2, each of the Y component values is between 0 and 1, and each of the UV component values is between −1 and 1. Both the color component values and the conversion coefficients are 8-bit values.

Thus, color conversion comprises a series of fixed point multiplication instructions. Multiplication instructions typically take longer to execute than addition or subtraction instructions. One of the reasons for this difference is that multiplication of two values of a first width yields a result of twice that width. For instance, multiplication of two 8-bit values yields a 16-bit result. It is typically necessary to store this twice-width result in a special register (or in two single-width registers), then shorten the result value so that it can be stored in one single-width register. This adds to the time required to execute the instruction.

It would therefore be desirable to provide systems and methods for performing fixed-point fractional multiplication of the type used in color conversion without requiring more time than an addition or subtraction operation, and without loss of accuracy in the result.

SUMMARY OF THE INVENTION

One or more of the problems outlined above may be solved by the various embodiments of the invention. Broadly speaking, the invention includes systems and methods for performing multiplication of fixed-point fractional values with the same throughput as addition and subtraction operations, and without loss of accuracy in the result.

In one embodiment, a method is implemented in a single-instruction-multiple-data (SIMD) microprocessor for performing fixed-point multiplication operations. The method includes reading data from a pair of source registers that contains multiple single-width multiplicand values. Each multiplicand value in one of the source registers is paired with a corresponding multiplicand value in the other source register. For each pair of multiplicands, a double-width product is generated, then a single-width portion of the product is selected and stored in a target register. The selection of the single-width portion is performed by shifting the double-width products in funnel shifters. The immediate shifting of the double-width products to select the single-width portions allows the operation to achieve the same throughput as addition and subtraction operations.

In one embodiment, the funnel shifters shift the double-width products by a designated shift amount that is provided in the multiplication instruction. An exemplary instruction includes the opcode for the multiplication instruction, the shift amount, and the locations of the source and target registers. In an alternative embodiment, a multiply-and-add (or multiply-and-accumulate) operation may be performed. In this case, the target register initially contains a set of single-width values. These values are provided to funnel shifters, which select the desired portions of the multiplication products. Then, the selected portions are added to the values initially stored in the target register. The sum is then stored in the target register.

Another alternative embodiment comprises a microprocessor. The microprocessor includes a multiplication unit and funnels shifters. The microprocessor receives and executes SIMD instructions that may include, for example, an opcode for a multiplication operation, a shift amount, and locations of source and target registers. The microprocessor reads pairs of single-width multiplicands from the source registers, multiplies them and provides corresponding double-width products to the funnel shifters. The funnel shifters shift the double-width products by the shift amount identified in the instruction and select a resulting single-width portion of each of the products. The result is then stored in the target register. The multiprocessor may also be configured to perform multiply-and-add operations by reading initial values from the target register and then adding these values to the selected portions of the double-width products. The sum is then stored in the target register. This functionality may be implemented in a standalone processor, or in one of a plurality of processor cores in a multiprocessor unit.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 2:
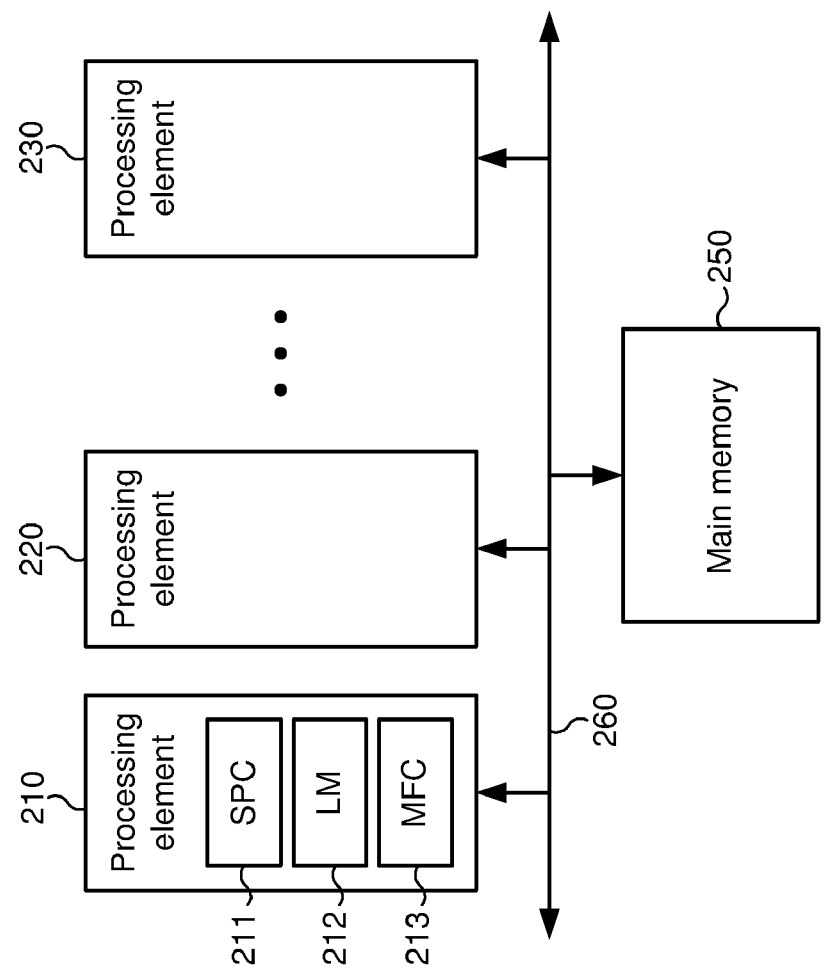
FIG. 2 is a functional block diagram illustrating a multiprocessor computer system in accordance with the prior art.

While the invention is subject to various modifications and alternative forms, specific embodiments thereof are shown by way of example in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Broadly speaking, the invention includes systems and methods for performing multiplication of fixed-point fractional values with the same throughput as addition and subtraction operations without loss of accuracy in the result.

Figure 1:
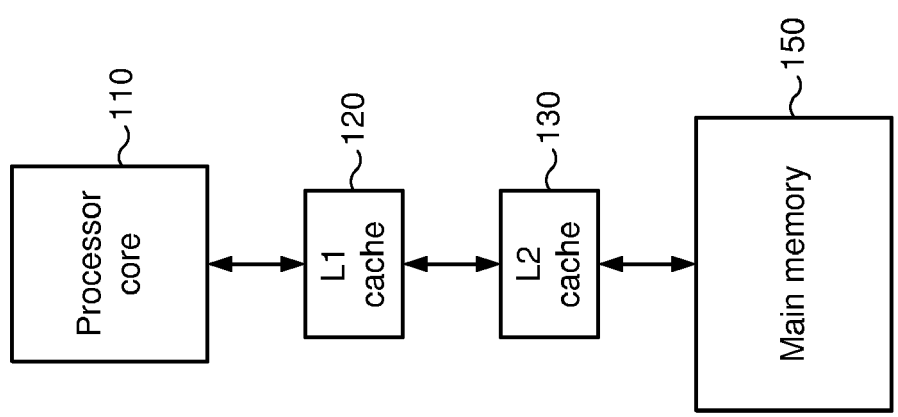
FIG. 1 is a functional block diagram illustrating the interconnection of a computer processor with cache memories and a main memory in accordance with the prior art.

Conventional computer systems typically employ a memory system that includes not only a main memory, but also one or more cache memories. A typical memory hierarchy is illustrated in FIG. 1. FIG. 1 is a functional block diagram that shows the interconnection of a computer processor with cache memories and a main memory. Processor 110 is coupled to a first cache memory 120, which is typically referred to as the level 1, or L1 cache. The L1 cache is, in turn, coupled to cache memory 130, which is referred to as the level 2, or L2 cache. L2 cache 130 is coupled to main memory 150.

Main memory 150 may be capable of storing up to four gigabytes of data, but it typically requires multiple processor cycles to perform each data access to the main memory. Cache memories 120 and 130 are provided in order to reduce the latency of these data accesses. Each of the cache memories is substantially smaller than the main memory, but they can be accessed more quickly (with lower data latency) than the main memory. Each successive cache memory is normally slightly larger than the preceding cache memory, and has a slightly higher data latency than the preceding cache memory. Thus, for example, L1 cache 120 may only be capable of storing eight or sixteen kilobytes of data, but the data stored in this cache may be accessible in a single processor cycle. L2 cache 130 might then be configured to store half or four kilobytes of data that can be accessed in two processor cycles. It should be noted that additional levels of cache memory can be implemented, with each successive memory having greater data capacity and greater data latency.

The conventional memory hierarchy of FIG. 1 is typically used because it provides both a wide memory address space and relatively fast access to the data stored in the memory. When processor 110 needs to access data, it forwards a data access request to L1 cache 120. If the data is currently stored in L1 cache 120, the data is returned by the L1 cache to the processor. If the desired data is not currently stored in L1 cache 120, the L1 cache forwards the data access request to L2 cache 130. If L2 cache 130 currently stores the data, the data is returned by the L2 cache to L1 cache 120, which then forwards the data to processor 110. L1 cache 120 also stores the data returned by L2 cache 130 so that it will be available in the L1 cache if processor 110 makes another access request for this data. If L2 cache 130 does not currently store the desired data, the L2 cache will forward the data access request to main memory 150. Main memory 150 will retrieve the requested data and return the data to L2 cache 130, which will store the data itself and forward the data to L1 cache 120. As noted above, L1 cache 120 will also store the data, and will forward the data to processor 110.

Some computer systems use other memory architectures to store data that is used by the systems' processor(s). For example, in the multiprocessor computer system illustrated in FIG. 2, each processor core is designed to access only data which is stored in a local memory associated with that core. As shown in the functional block diagram of FIG. 2, the system includes multiple processing elements (SPE's) 210-230, each of which is connected to a main memory 250 by an internal bus 260. In this system, each of the processing elements is designed to perform a relatively specialized function using instructions and data that can be stored in a relatively small amount of memory space.

Each processing element includes a processor core (SPC), a local memory (LM) and a memory flow control unit (MFC). For example, processing element 210 includes processor core 211, local memory 212 and memory flow control unit 213. The memory flow control unit of each processing element functions as a direct memory access (DMA) engine which transfers data between the corresponding local memory (e.g., 212) and main memory 250. Because each processing element performs a relatively specialized function, the instructions and data necessary to perform a function can typically reside within the local memory of the processing element, which may have a data capacity on the order of 256 kilobytes. The memory flow control unit for the processing element therefore retrieves the necessary instructions and data from main memory 250 and then loads these instructions and data into the local memory for execution and processing by the processor core. If new instructions and/or data are needed by the processor core, the memory flow control unit will transfer unneeded data from the local memory back to main memory 250 if necessary, and will load new instructions and/or data from the main memory into the local memory. These data transfers may be performed in parallel with the execution of other instructions and/or processing and other data by the processor core.

A multiprocessor computer system of the type illustrated in FIG. 2 can provide a great deal of processing power because multiple processor cores are used. It may be more difficult, however, to take advantage of this processing power than to make use of a conventional single-processor system because of the limited amount of local memory space that is available for storing instructions and data that are used by the individual processing elements in the multiprocessor system. While a novice programmer can, with relative ease, produce a program that is efficiently executed by a single-processor computer system supported by a conventional memory hierarchy, it typically requires much greater proficiency to be able to produce a program that is executable within the constraints of the limited local memory of the multiprocessor system. The increased skill level that is required to program a multiprocessor system such as the one illustrated in FIG. 2 may limit the utility of such a system. It would therefore be desirable to provide a computer system that has the increased computational power of the multiprocessor system and the ease-of-programming of the conventional single-processor system.

Figure 3:
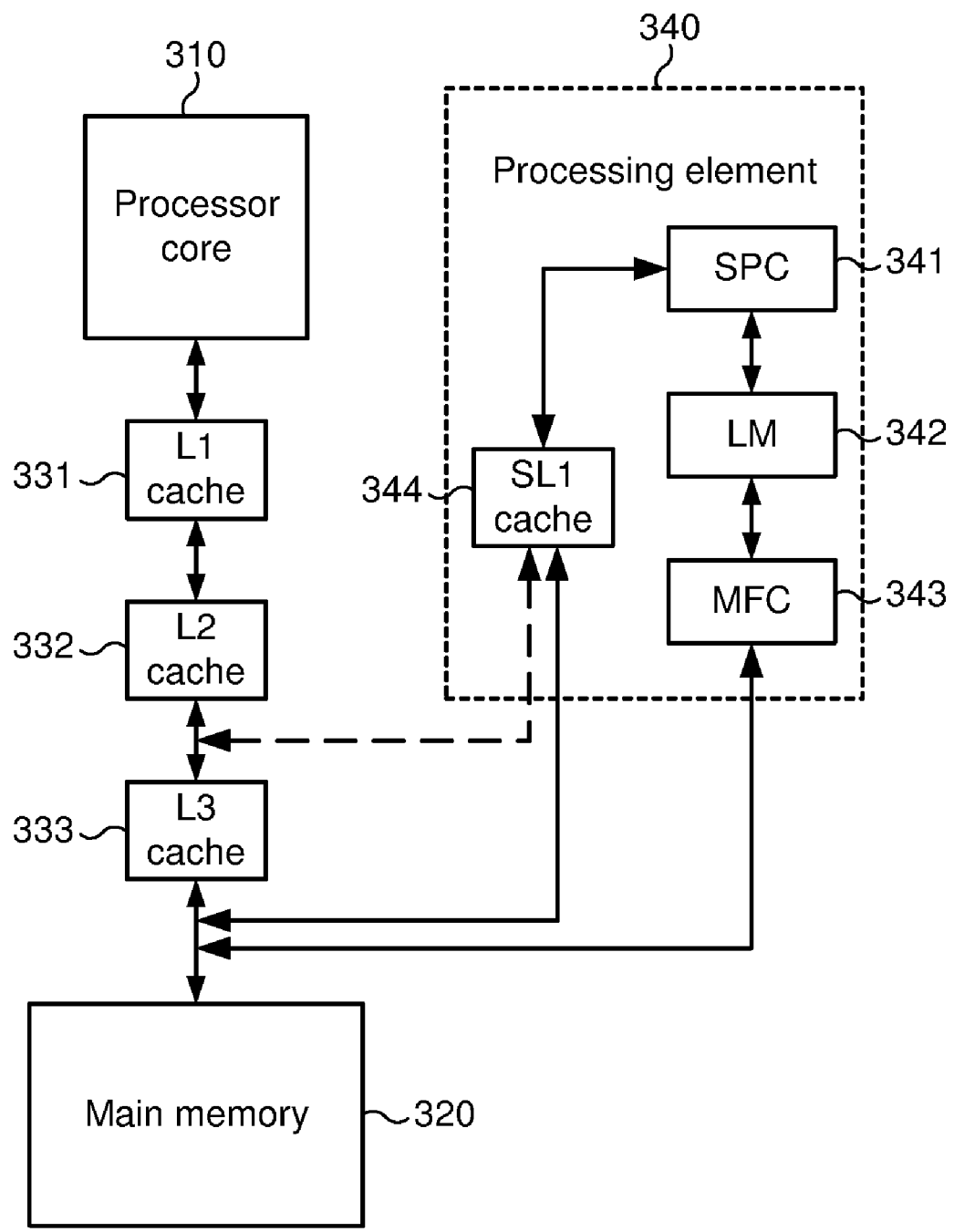
FIG. 3 is a block diagram illustrating the structure of a multiprocessor system that includes both a primary processor core that is linked to the main memory using a conventional memory hierarchy, and multiple processing elements that include local memories and cache memories that are linked to the main memory in accordance with one embodiment.

In order to provide these benefits, one multiprocessor system incorporates a cache memory into each processing element to provide a link between the processor core of the processing element and the main memory. This is illustrated in FIG. 3. FIG. 3 is a block diagram illustrating the structure of a multiprocessor system that includes both a primary processor core that is linked to the main memory using a conventional memory hierarchy, and multiple processing elements that include local memories and cache memories that are linked to the main memory.

In this embodiment, primary processor core 310 is linked to main memory 320 through three levels of cache memories, 331-333 (L1-L3, respectively). Primary processor core 310 accesses data through this conventional memory hierarchy, first accessing L1 cache 331, then L2 cache 332, then L3 cache 333, and finally main memory 320. Processing element 340 is one of a plurality of processing elements in the multiprocessor system. The remaining processing elements are not shown in this figure for purposes of clarity, but these processing elements have structures which are identical to the structure of processing element 340.

Processing element 340 includes a processor core 341, a local memory 342 and a memory flow controller 343 that are essentially as described above in connection with FIG. 2. Processing element 340, however, can access not only data that is stored in local memory 342, but also the data that is stored in a local cache 344 (the SL1 cache) and main memory 320. Thus, while processor core 341 can rapidly access the data stored in local memory 342, it is not limited to accessing this data, which must be loaded by memory flow controller 343 from main memory 320. Processor core 341 can also access the entire memory space that is available to primary processor 310 by forwarding a request for this data to SL1 cache 344.

SL1 cache 344 is coupled to main memory 320 to form a memory hierarchy similar to the one used by primary processor 310, except that the memory hierarchy coupled to processor core 341 has a single level of cache memory, rather than the three levels formed by cache memories 331-333. It should be noted that, in an alternative embodiment, SL1 cache 344 can be coupled to the caches of the primary processor (e.g., to L3 cache (333) as indicated by the dashed line), rather than being directly coupled to main memory 320. In this case, processor core 341 would access main memory 320 through SL1 cache 344 and L3 cache 333. SL1 cache 344 is, in this embodiment, a small cache, storing only 8-32 kilobytes of data. SL1 cache 344 is, however, configured to use the full (e.g., 64-bit) addressing employed by primary processor 310, so that processor core 341 can access all available data in main memory 320.

Figure 4:
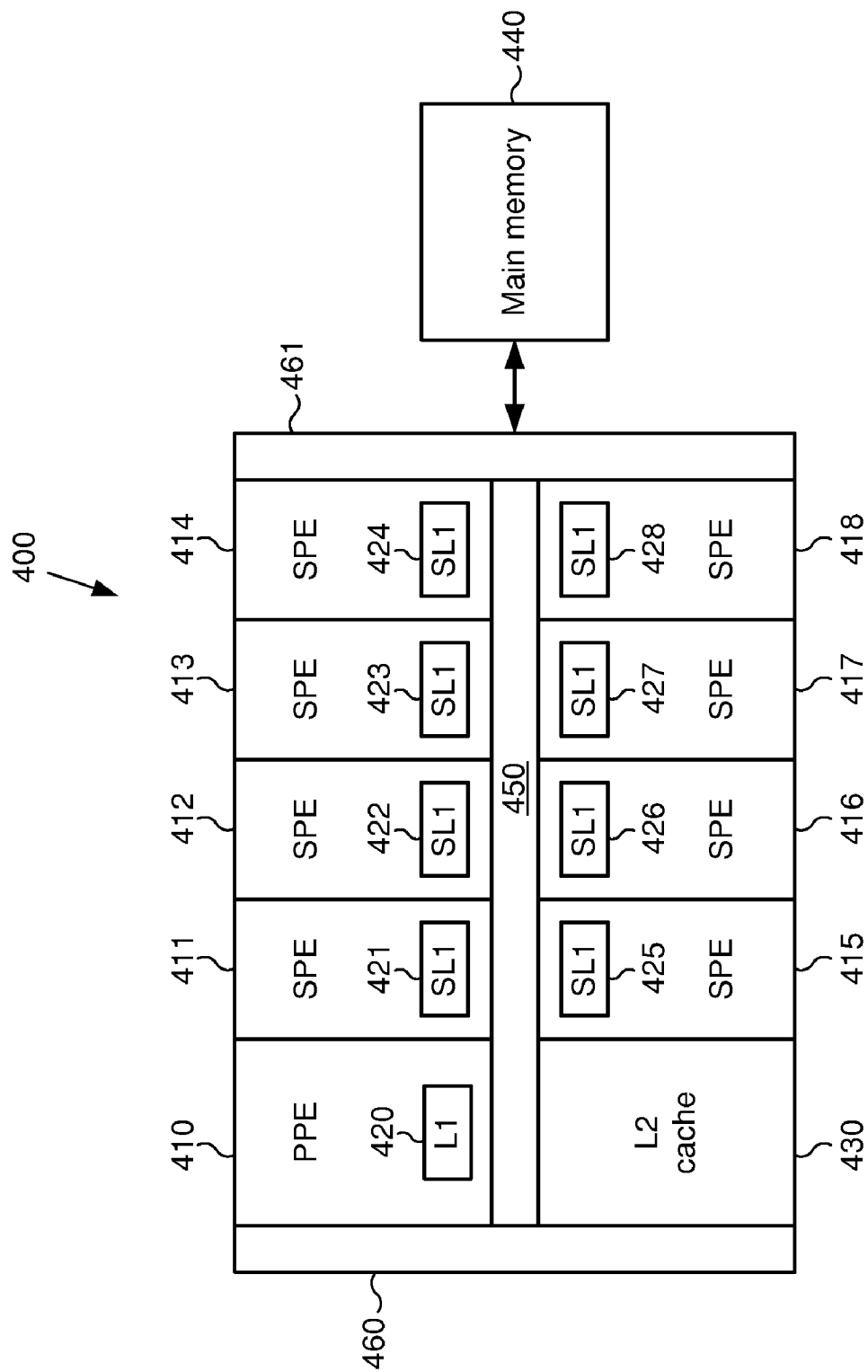
FIG. 4 is a block diagram illustrating the structure of a multiprocessor system that includes both a primary processor core and eight processing elements in accordance with one embodiment.

The LS1 cache illustrated in FIG. 3 can be implemented in a variety of multiprocessor systems. For example, the Cell processor jointly developed by Toshiba, Sony and IBM has eight processing elements into which the LS1 cache can be incorporated. Referring to FIG. 4, a Cell-type multiprocessor system 400 includes a primary processing element 410, and eight specialized processing elements 411-418. Each of processing elements 410-418 is coupled to an internal bus 450 which allows the processing elements to communicate with each other and with other components of the system. Input/output (I/O) interfaces 460 and 461 are coupled to internal bus 450 to allow the processing elements to communicate with other components of the system that are external to the die on which the processing elements are constructed. Primary processing element 410 includes a first-level cache 420, which is coupled to a second-level cache 430, which is in turn coupled to a main memory 440. Each of specialized processing elements 411-418 includes its own local cache (421-428, respectively) which functions in the same manner as the SL1 cache 344 of FIG. 3. Local caches 421-428 couple the respective specialized processing elements to main memory 440.

The systems illustrated in FIGS. 3 and 4 can enable even a novice programmer to write applications for execution by a multiprocessor system. Rather than being confined to the amount of space in the local memory, the programmer can access any available data in the main memory through the SL1 cache. The availability of data through the SL1 cache may also relieve the programmer of the need to program data transfers to and from the local memory using the memory flow controller.

By enabling access to a wider memory space, the addition of the local (SL1) cache facilitates the programming of the specialized processing elements in the Cell-type processor, and thereby makes this multiprocessor system available for use by programmers having a much wider range of skills. In particular, this allows novice programmers greater freedom in programming the specialized programming elements. The greater ease of programming the specialized processing elements opens this type of processor to a greater range of applications and makes available the increased number of processing threads that can be handled by this multiprocessor system. In one embodiment, the primary processing element can execute two threads, while each of the specialized processing elements can process a single thread. The processor can therefore execute ten threads simultaneously. Other systems may use two or even three primary processing elements that can each execute two concurrent threads, but this still allows a maximum of only six threads, in comparison to the ten threads of the Cell-type processor.

In order to maximize use of the multiprocessor system illustrated in FIGS. 3 and 4, it is desirable to minimize the time required to perform the individual instructions that are executed by the processor. When the processor is used in multimedia applications, it is particularly important to minimize the time required to perform often-used complex operations, such as the fixed-point fractional multiplication operations that are employed in the color conversion of image data. Embodiments of the present invention are therefore intended to achieve the same throughput of multiplication and multiplication-accumulated instructions as can be achieved for addition and subtraction operations.

Figure 5A:
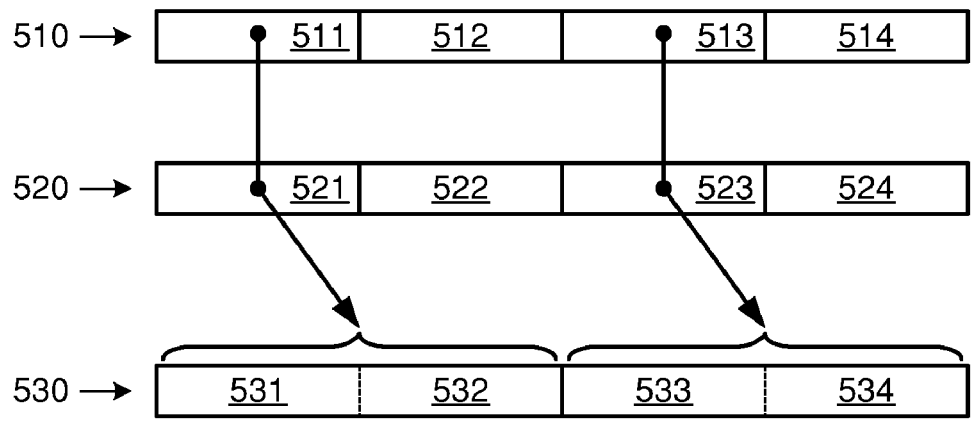
FIGS. 5A and 5B are diagrams illustrating the multiplication of two n-bit-wide values to generate a product that is 2n bits wide, and storing the 2n-bit-wide values.
Figure 5B:
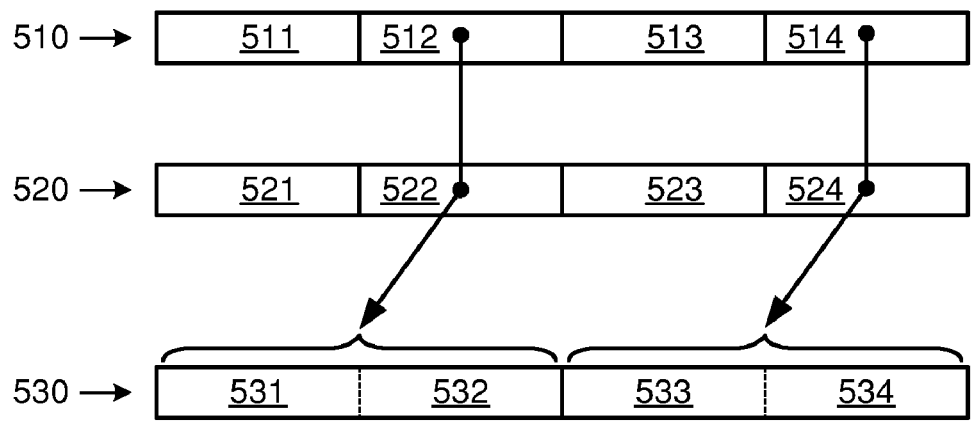

As noted above, the multiplication of two n-bit-wide values generally results in a product that is 2n bits wide. This complicates the problem of multiplying values in multiple-word lines and storing the resulting products in lines of the same size. This is illustrated in FIGS. 5A-5B. In these figures, a first line of data 510 includes four separate values, 511-514, and a second line of data 520 contains another four values 521-524. Each line of data may, for example, contain 128 bits, where each of the separate values comprises 32 of the 128 bits.

While it may be desirable to multiply the values in the first and second lines to produce values that can be stored in a similarly structured third line of data (530), this is difficult because the products of the multiplied values would typically be 64 bits long.

Thus, it would be possible to multiply half of the values in lines 510 and 520, and store the products in line 530 as shown in FIGS. 5A and 5B, for instance. FIG. 5A shows that values of 32-bit words 511 and 521 are multiplied to produce a 64-bit value that is stored in words 531 and 532, and the values of 32-bit words 513 and 523 are multiplied to produce a 64-bit value that is stored in words 533 and 534. Alternatively, as shown in FIG. 5B, the values of words 512 and 522 can be multiplied to produce a 64-bit value that is stored in words 531 and 532, and the values of 32-bit words 514 and 524 are multiplied to produce a 64-bit value that is stored in words 533 and 534. In either case, it would be necessary to truncate each of these products to 32 bits before all four could be stored in a single 128-bit line of data. In the case of a fixed point multiplication, a portion in the middle of the 64-bit value is selected. The particular portion that is selected depends upon the position of the decimal point and the possible range of values.

Figure 6:
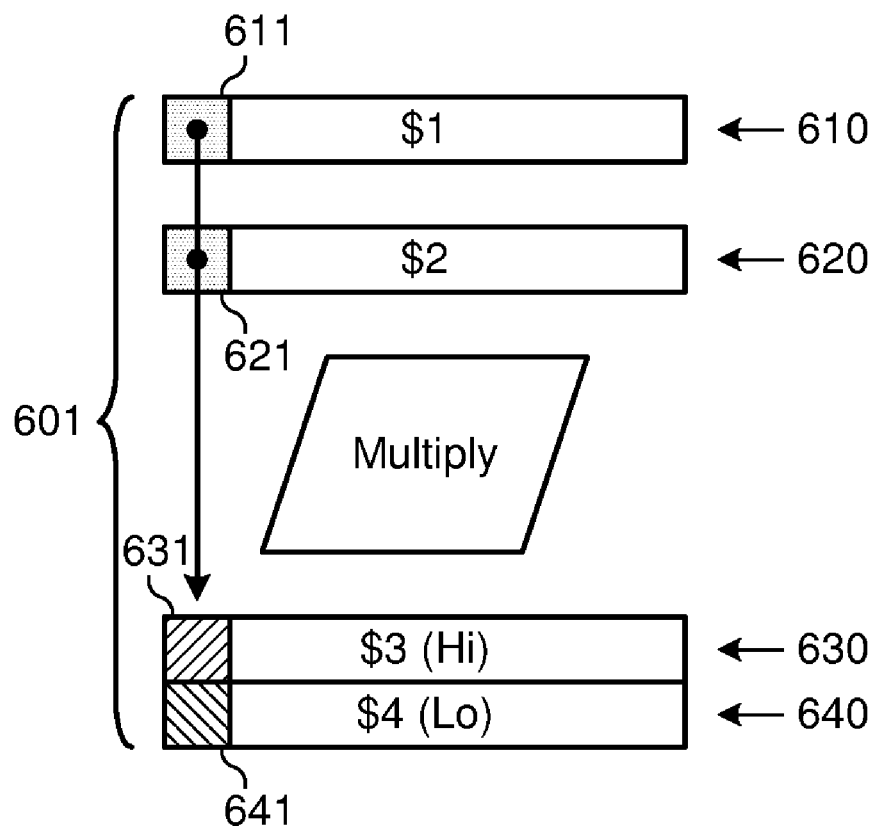
FIG. 6 is a diagram illustrating a first prior art method for multiplying multiple values in wide registers and storing the resulting products in a target register of the same width.
Figure 6:
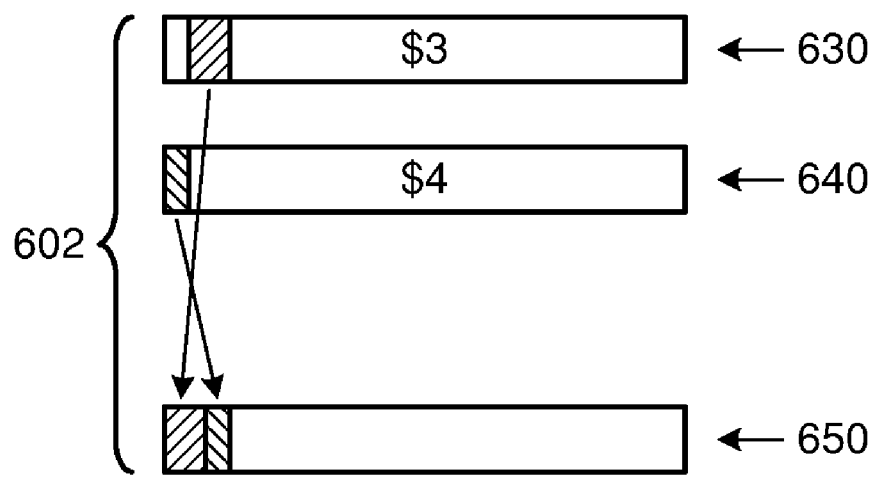
Figure 7:
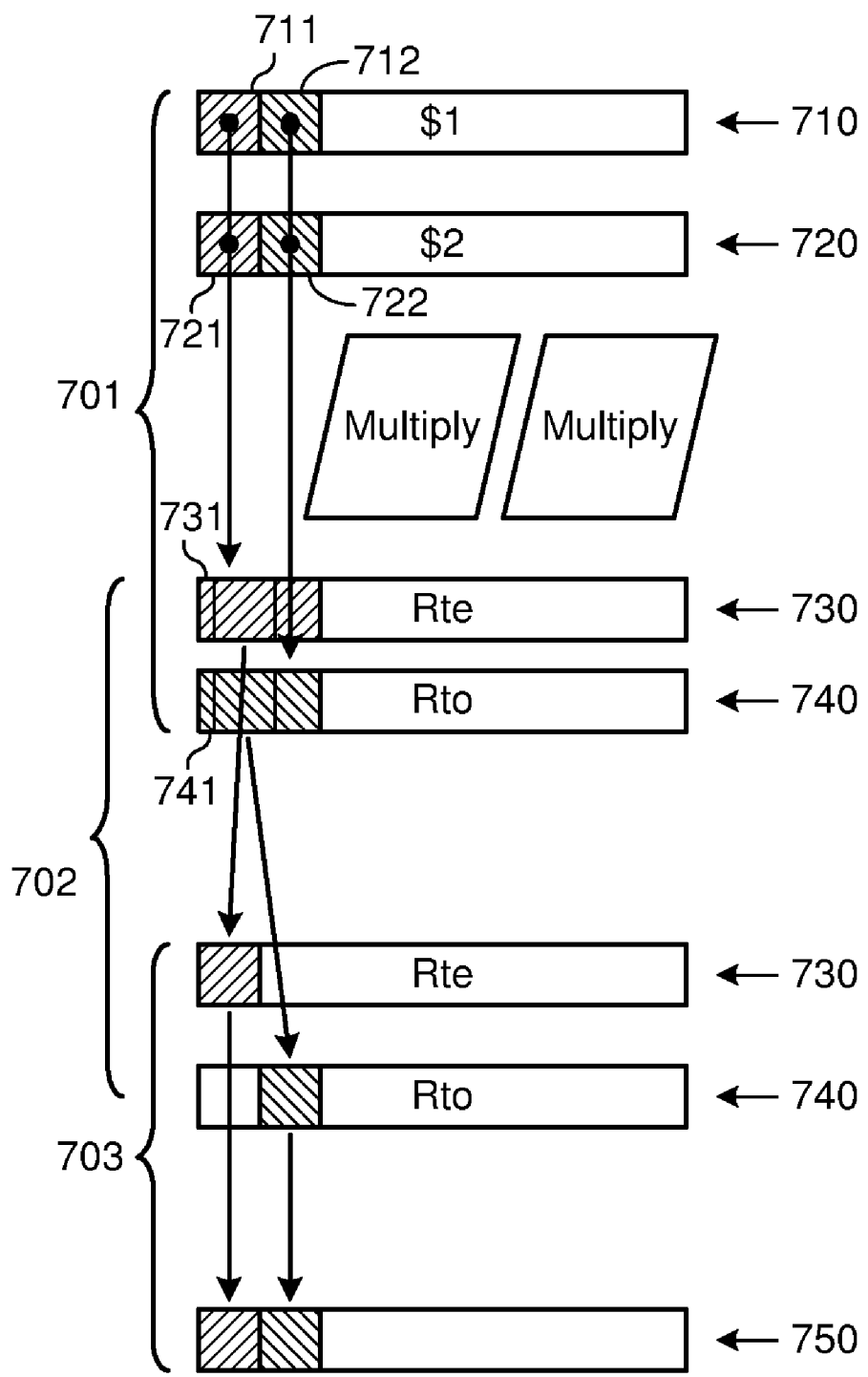
FIG. 7 is a diagram illustrating a second prior art method for multiplying multiple values in wide registers and storing the resulting products in a target register of the same width.

In the prior art, there were two methods for performing the multiplication operations illustrated in FIGS. 5A and 5B. These methods are illustrated in FIGS. 6 and 7. Referring to FIG. 6, a first prior art method for multiplying multiple values in wide registers and storing the resulting products in a target register of the same width is shown. In this method, two lines of data are stored in general-purpose registers 610 and 620. Registers 610 and 620 may, for example, be 128 bits wide. Each of registers 610 and 620 stores multiple, separate values. The individual values in register 610 are multiplied by corresponding ones of the individual values in register 620. That is, the first value in register 610 is multiplied by the first value in register 620, the second value in register 610 is multiplied by the second value in register 620, and so on. In a first part (601) of the method, the result of each multiplication is stored in special-purpose registers 630 and 640. More specifically, an upper portion of the result is stored in the high register (630), and a lower portion of the result is stored in the low register (640). Thus, and is shown in FIG. 6, value 611 is multiplied by value 621, and the upper portion of the result is stored in location 631, while the lower portion of the result is stored in location 641.

Neither special-purpose register 630 nor special-purpose register 640 stores the complete result of the multiplication of the values in general-purpose registers 610 and 620. It is therefore necessary to perform the second part (602) of the method in which the appropriate portions of the contents of registers 630 and 640 are selected, merged together, and stored in a general-purpose register 650. As shown in the figure, the upper portion of the product, which is stored in location 631, is shifted to the left by some amount. The lower portion of the product, which is stored in location 641, is shifted to the right. The combined amounts by which the values are shifted our equal to the width of the original values, 611 and 621. After the upper and lower portions of the product are shifted, they are merged into a single value which is stored in location 651 of general-purpose register 650.

The method illustrated in FIG. 6 can be implemented using the following sequence of pseudo instructions:
Mul $1*$2→HiLo
MFHI $3
MFLO $4
Shift left $3
Shift right $4
Merge $3, $4
Accumulate Referring to FIG. 7, a second prior art method is shown for multiplying multiple values in wide registers and storing resulting products in a target register of the same width. In this method, two lines of data are again stored in general-purpose registers (710, 720). In a first part (701) of the method, rather than storing the product of two values in high and low registers, the product is stored in a single one of two general-purpose registers (730, 740). Each succeeding product is stored in an alternate one of general-purpose registers 730 and 740. Thus, the first pair of values (711, 721) in registers 710 and 720 are multiplied, and the resulting product (731) is stored in general-purpose register 730, then the second pair of values (712, 722) are multiplied and the resulting product (741) is stored in general-purpose register 740, and so on. Consequently, the products of even pairs are stored in register 730, while the products of odd pairs are stored in register 740. (It should be noted that conventional numbering in the computer field begins with 0, so values 711 and 721—the "zeroth" values—are considered even for this purpose.) Each product (e.g., 731, 741) is twice the width of the values being multiplied.

In a second part (702) of the method, the portion of each twice-width value stored in general-purpose registers 730 and 740 that will be retained is selected. This may, for example, be achieved by shifting the values so that the desired portion of each value is within a selected window within each general-purpose register. In registers 730 and 740, the window for each product corresponds to the position of the values in registers 710 and 720 that produced the product. For example, because product 731 results from values 711 and 721, the window occupies the same position as these values. If each of values 711 and 721 are eight bits wide, the window will include the first eight bits of register 730. Likewise, the window for product 741 occupies the same position as values 712 and 722, which would be the second set of eight bits in register 740. After the desired portions of the products are shifted to the corresponding windows within general-purpose registers 730 and 740, the last part of the method (703) consists of merging the selected portions of the products into general-purpose register 750.

The method illustrated in FIG. 7 can be implemented using the following sequence of pseudo instructions:
Mul even RA*RB→Rte
Mul odd RA*RB→Rto
Shift Rte, Rto
Merge Rte, Rto
Accumulate In contrast to the prior art methods of FIGS. 6 and 7, the present systems and methods do not require the storage of double-width products, followed by shifting and merging of the resulting values. Instead, the initial values are multiplied, and the resulting products are immediately shifted by funnel shifters to produce products of the same width as the initial values. As a result, the multiplication can be performed with the same throughput as addition and subtraction operations.

Figure 8:
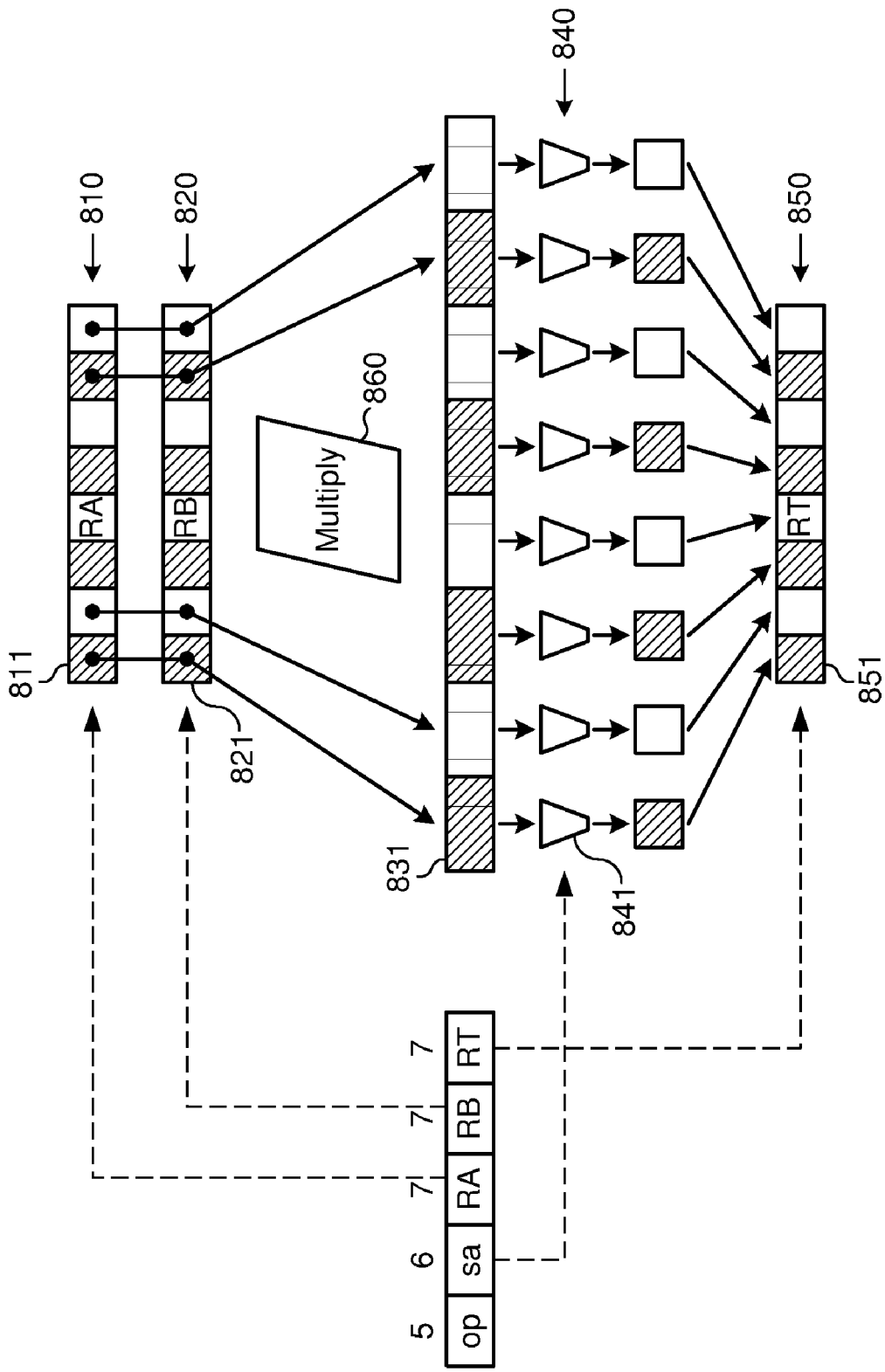
FIG. 8 is a diagram illustrating a method for multiplying multiple values in wide registers and storing the resulting products in a target register of the same width in accordance with one embodiment of the invention.

Referring to FIG. 8, a method in accordance with one embodiment of the invention is shown. In this embodiment, the values to be multiplied are stored in registers 810 and 820. Each pair of values (e.g., 811 and 821) is multiplied, producing a resulting product (e.g., 831) that is twice the width of these initial values. This double-width product is provided to one of funnel shifters 840 (e.g., 841). The funnel shifter shifts the bits of the product by a designated amount, and produces an output value which has the same width as the initial values. This single-width output value (e.g., 851) is stored in a general-purpose register 850 which has the same width as general-purpose registers 810 and 820.

The method illustrated in FIG. 8 can be implemented using the pseudo instruction:

(RA*RB)>>sa→Rte

This method is suitable for fixed-point multiplication such as is performed in color conversion. As noted above, color conversion involves multiplication of RGB component values by conversion coefficients to produce YUV component values. The RGB component values are fixed point values between 0 and 2. The conversion coefficients are fixed point values between −2 and 2. Consequently, the YUV component values are fixed point values between −1 and 1 (Y component values are between 0 and 1, and UV component values are between −1 and 1). All of the color component values and the conversion coefficients are 8-bit values. The conversion coefficients and UV component values are signed, and the others are not.

The multiplication of an RGB component value by a conversion coefficient can be illustrated by the following, where x represents a binary digit and s represents a sign (±):

x.xxxxxxx*sx.xxxxxx=sxx.xxxxx_xxxxxxxx

Because it is known that the product ("sxx.xxxxx_xxxxxxxx") is between 0 and 1 for Y component values and between −1 and 1 for UV component values, the shift amount for the funnel shifters is fixed for each of these components. Of the 16 bits [0:15] in the product, the funnel shifters should select bits [2:9] ("x.xxxxxxx") for the Y component values and bits [1:8] ("sx.xxxxxx") for the UV component values. Thus, the shift amount is known for each of the fixed-point multiplication operations that is performed, and can be set by the application.

Because the products of the multiplication are immediately funnel shifted to produce single-width results that can be stored in a general-purpose register, the multiplication operation can be performed using a single instruction. The structure of an exemplary instruction is depicted on the left side of FIG. 8. The instruction includes five components: an opcode (op); a shift amount (sa); a first source register (RA); a second source register (RB); and a target register (RT). The width of each component is indicated in the figure. The opcode which identifies the instruction as a multiplication operation comprises five bits. The shift amount, which comprises six bits, designates the number of bits by which the funnel shifters will shift each of the double-width products. Each of the register components of the instruction uses seven bits to identify the corresponding registers. The total length of the instruction is therefore 32 bits.

As indicated above, the present methods can be implemented in a SIMD processor that operates on 128-bit lines of data. The six bits that are provided to indicate the shift amount are sufficient to express the shift amount, as well as the data type (byte, halfword, word). The possible combinations of data type in shift amount can be expressed as shown in the table below. The digits in the table indicate the data type, while the x's in the table represent the bits that are available to express the shift amount.

TABLE 1

| | |
|---|---|
| 0xx xxx | Word Lo(0) . . . 31 |
| 10x xxx | Halfword Lo(0) . . . 15 |
| 110 xxx | Byte Lo(0) . . . 7 |
| 111 000 | Word Hi(32) |
| 111 100 | Halfword Hi(16) |
| 111 110 | Byte Hi(8) |

An alternative embodiment of the invention comprises a processor core configured to perform multiplication or multiply-and-add instructions according to the methodology described above. FIG. 8 can be viewed as the structure of such a processor core as well as a method. In this case, the processor includes two source registers 810 and 820, a multiplication unit (or arithmetic logic unit) 860, one or more funnel shifters 840 and a target register 850 (which can also be a source register for a multiply-and-add operation). This processor core can be an independent processor, or one of a plurality of processor cores in a multiprocessor unit such as the cell microprocessor.

Figure 9:
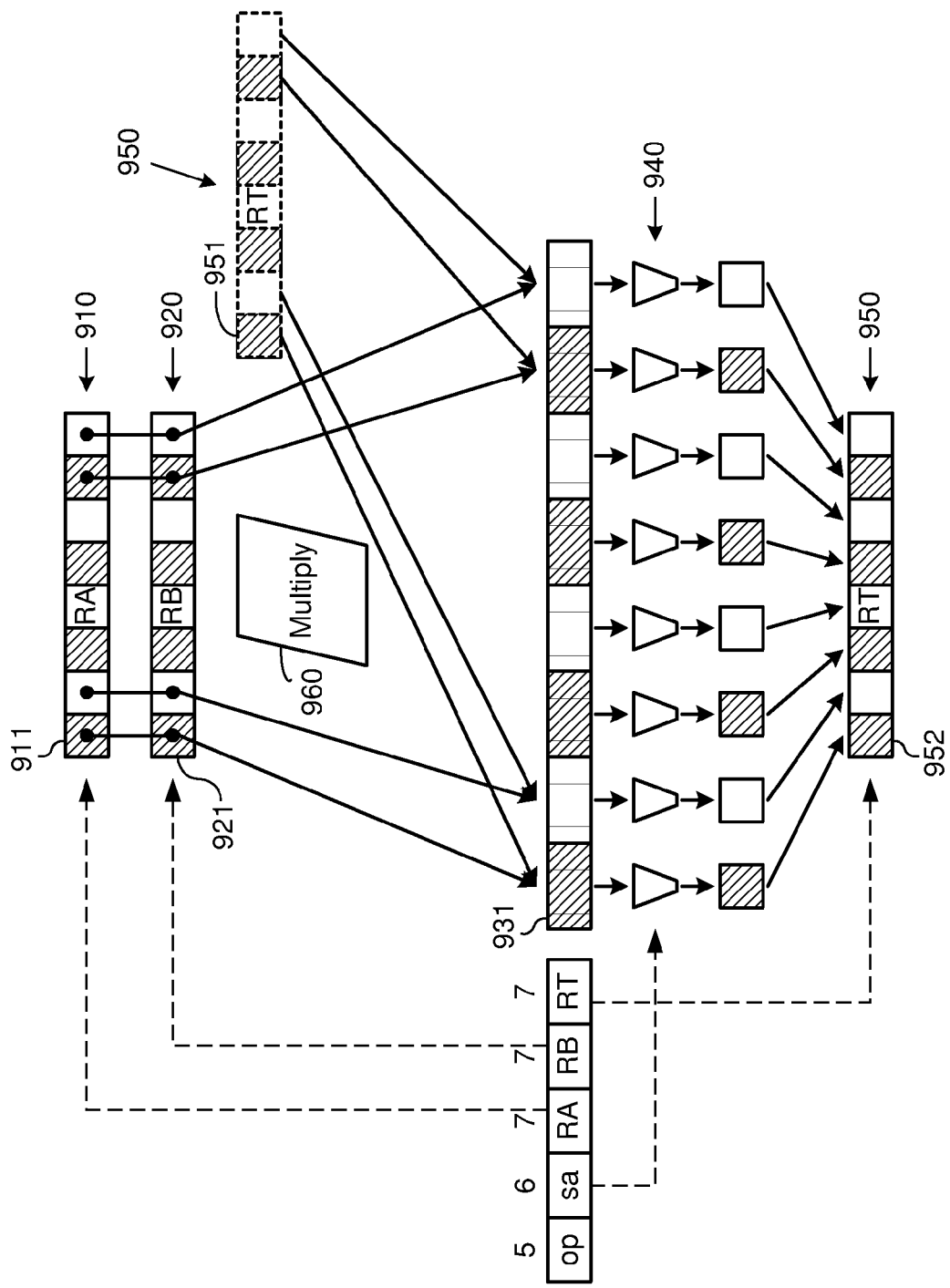
FIG. 9 is a diagram illustrating a system and method for performing multiply-and-add operations in accordance with one embodiment of the invention.

It should be noted that multiply-and-add instructions can also be implemented in embodiment of the present invention. This is illustrated in FIG. 9. In this example, the values in two source registers (910 and 920) are multiplied in the same manner as in FIG. 8, but the value in the target register (950) is also added to the partial products before the result of the multiply-and-add is stored in the target register. While the addition conceptually occurs after the multiplication, the addends in target register 950 are added in multiplication unit 960 to the respective partial products of the multiplicands in source registers 910 and 920 to generate the double-width results that are provided to funnel shifters 940.

Thus, for example, values 911 and 921 are multiplied to produce a pair of partial products. These partial products and value 951 which was previously stored in target register 950 are then added together by multiplication unit 960 to produce double-width result 931. Double-width result 931 is provided to one of funnel shifters 940, which select the desired portion of double-width result 931 based upon the designated shift amount, sa. The selected portion 952 is then stored in target register 950 in place of value 951.

While the disclosure of the present application discusses the invention in the context of multiprocessor computing systems, it should be noted that the invention is more widely applicable and can be used in a variety of other contexts. Consequently, the disclosure should not be considered as limiting the invention to the field of multimedia game systems.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

What is claimed is:

1. A method implemented in a single-instruction-multiple-data (SIMD) microprocessor for performing fixed-point multiplication operations, the method comprising:
   (a) reading data from a pair of source registers, wherein each source register contains multiple single-width multiplicand values, and wherein each multiplicand value in one of the source registers is paired with a corresponding multiplicand value in the other one of the source registers; and
   (b) for each pair of multiplicands,
      (i) generating a double-width product of the pair of multiplicands,
      (ii) selecting a single-width portion of the product, and (iii) storing the single-width portion of the product in a target register;

(c) wherein (i)-(iii) are performed without storing the double-width products.

2. The method of claim 1, wherein selecting the single-width portion of the product for each pair of multiplicands is performed by providing the double-width product to a funnel shifter that is configured to shift the double-width product by a designated shift amount.

3. The method of claim 2, further comprising reading the designated shift amount from an instruction and providing the designated shift amount to the funnel shifter.

4. The method of claim 3, further comprising, prior to reading data from the pair of source registers, reading a multiplication opcode and identifiers of the pair of source registers and the target register from the instruction.

5. The method of claim 1, wherein (i)-(iii) are performed in parallel.

6. A method implemented in a single-instruction-multiple-data (SIMD) microprocessor for performing fixed-point multiplication operations, the method comprising:

(a) reading data from a pair of source registers, wherein each source register contains multiple single-width multiplicand values, and wherein each multiplicand value in one of the source registers is paired with a corresponding multiplicand value in the other one of the source registers; and (b) for each pair of multiplicands,
  (i) generating a double-width product of the pair of multiplicands,
  (ii) selecting a single-width portion of the product,
  (iii) reading a single-width target value from a target register, and
  (iv) storing a sum of the single-width portion of the product and the single-width target value in the target register;

(c) wherein (i)-(iv) are performed without storing the double-width products.

7. The method of claim 6, wherein (i)-(iv) are performed in parallel.

8. The method of claim 6, wherein (i)-(iv) are performed without storing the single-width portions of the products.

9. The method of claim 6, wherein selecting the single-width portion of the product for each pair of multiplicands is performed by providing the double-width product to a funnel shifter that is configured to shift the double-width product by a designated shift amount.

10. The method of claim 9, further comprising reading the designated shift amount from an instruction and providing the designated shift amount to the funnel shifter.

11. The method of claim 10, further comprising, prior to reading data from the pair of source registers, reading a multiplication opcode and identifiers of the pair of source registers and the target register from the instruction.

12. A device comprising:
a multiplication unit configured to
  receive two sets of source data, wherein each set includes a number, N, of single-width multiplicands, and
  multiply pairs of the single-width multiplicands, wherein the pair includes one single-width multiplicand from each of the sets, to produce N double-width products;
one or more funnel shifters configured to receive the double-width products and to select a single-width portion of each of the products; and
a target register configured to receive and store the selected single-width portions of each of the products;
wherein the multiplication unit is configured to provide the double-width products to the funnel shifters without storing the double-width products.

13. The device of claim 12, further comprising a pair of source registers, wherein each source register contains one of the sets of single-width multiplicands.

14. The device of claim 12, wherein the multiplication unit is configured to multiply the pairs of single-width multiplicands in parallel.

15. The device of claim 12, wherein the funnel shifters are configured to select the single-width portion of each of the products by shifting each of the double-width products by a designated amount.

16. The device of claim 15, wherein the device comprises a processor core which is configured to receive an instruction, to read the designated shift amount from the instruction, and to provide the designated shift amount to the funnel shifters.

17. The device of claim 16, further comprising a pair of source registers, wherein each source register contains one of the sets of single-width multiplicands, and wherein the processor core is configured to read a multiplication opcode and identifiers of the pair of source registers and the target register from the instruction.

18. The device of claim 12, wherein the device comprises one of a plurality of processor cores that are implemented in a multiprocessor unit.

19. A device comprising:
a multiplication unit configured to
  receive two sets of source data, wherein each set includes a number, N, of single-width multiplicands, and
  multiply pairs of the single-width multiplicands, wherein the pair includes one single-width multiplicand from each of the sets, to produce N pairs of partial products, and
  add the N pairs of partial products with N corresponding single-width addends to produce N double-width products;
one or more funnel shifters configured to receive the double-width products and to select a single-width portion of each of the products; and
a target register configured to receive and store the selected single-width portion of each of the products;
wherein the multiplication unit is configured to provide the double-width products to the funnel shifters without storing the double-width products.

20. The device of claim 19, wherein the target register is configured to initially store the N single-width addends, and to thereafter store the selected single-width portion of each of the products.

* * * * *